United States Patent Office.

MAURICE CERESOLE, OF NEUVILLE-SUR-SAÔNE, FRANCE, ASSIGNOR TO THE BADISCHE ANILIN AND SODA FABRIK, OF LUDWIGSHAFEN, GERMANY.

RHODAMIN DYE.

SPECIFICATION forming part of Letters Patent No. 516,588, dated March 13, 1894.

Application filed March 17, 1892. Serial No. 425,318. (Specimens.) Patented in France August 24, 1891, No. 215,900.

*To all whom it may concern:*

Be it known that I, MAURICE CERESOLE, doctor of philosophy, a citizen of the Swiss Republic, residing at Neuville-sur-Saône, in the Department of the Rhône, France, have invented new and useful Improvements in the Manufacture of Rhodamin Dyes, (for which I have obtained a patent in France, No. 215,900, dated August 24, 1891,) of which the following is a specification.

This invention is based upon the discovery that tetra-alkylated rhodamin can by suitable means be converted into new dyestuffs possessing properties differing in many respects from and giving in each case yellower shades of color, than the dyes from which they are derived. This conversion of tetra-alkylated-rhodamin into new dyes is the result of a chemical change in the former which consists in the splitting off of one or more of the alkyl groups. This can be expressed by the following equations taking as instances a rhodamin of the phthalic acid series and one derived from succinic acid:

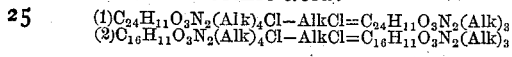

where Alk stands for ethyl or methyl. This effect can be brought about in various ways such as for instance, by heating the tetra-alkyl-rhodamin alone or by heating it with an indifferent diluent such as naphthalene; or by heating it with a diluting material such as anilin hydrochlorate which acts partly as a solvent and partly as a chemical reagent in that it combines with the alkyl and forms alkylated anilin compounds; or by heating it with suitable inorganic salts such as zinc chlorid. In each case, the reaction must be suitably moderated and interrupted when the desired shade is obtained. A prolonged treatment gives less valuable or worthless results.

The tetra-alkyl-rhodamins which have hitherto yielded the most valuable results are tetra-ethyl-rhodamin from phthalic acid and tetra-methyl-rhodamin from succinic acid but the process is applicable to the other tetra-alkyl-rhodamins of these series and to those of the benzo-rhodamin, formic acid and other series. By this application I intend to claim generally the coloring matters resulting from the application of said process to any tetra-alkylated-rhodamin of any series and specifically that particular dyestuff which results from the application of said process to tetra-ethyl-rhodamin from phthalic acid; and, excepting as it is generally claimed herein, I make no claim herein to the product obtained from tetra-methyl-rhodamin of the succinic acid series which product specifically, I have made the subject of a separate application, bearing even date with this present application.

The following directions will serve to illustrate the nature of my invention and the manner of carrying it into effect. The parts are by weight.

*Example 1.*—Three (3) parts of tetra-ethyl-rhodamin of the phthalic acid series are heated in a large enameled pot which can be heated by means of an oil bath. The temperature of the oil bath is raised gradually to about one hundred and thirty to two hundred and thirty-five degrees centigrade (130° to 235° C.) and maintained, keeping the mass well mixed for about two and a half to three hours ($2\frac{1}{2}$ to 3 hrs.) or until the crystals of the initial material are changed to a pasty mass possessing a bronze like sheen. This point being attained the mass is allowed to cool, broken up, dissolved in about forty parts of hot water, acidified with hydrochloric acid, and precipitated with common salt solution. These operations are repeated, until the desired degree of purity is attained and then it is recrystallized from hot water.

*Example 2.*—Mix together about three (3) parts of the aforesaid tetra-ethyl-rhodamin (or of tetra-methyl-rhodamin of the succinic series) with about three (3) parts anilin hydrochlorate in an enameled vessel, furnished with a stirrer, and melt the mixture by heating gradually to about one hundred and ninety degrees centigrade (190° C.). Stir well and maintain this temperature for about two (2) hours where tetra-ethyl-rhodamin is used (or about one hour and three quarters ($1\frac{3}{4}$ h.) where tetra-methyl-rhodamin is used) allow the mass to cool, dissolve it in hot water, rendered slightly acid with hydrochloric acid and precipitate with common salt solution.

Repeat this purification as often as is necessary and finally recrystallize from hot water slightly acidified with hydrochloric acid.

In applying my new process of dealkylation or splitting off alkyl groups to any tetra-alkyl-rhodamin whether by heating alone or with some other body as herein mentioned, the course of the reaction and the point when it should be interrupted can be ascertained by drawing samples of the product from time to time, working up and making experimental dye tests. The heating is continued in each case until the desired shade is obtained. A short period of heating results in the production of shades redder than those which can be obtained by more prolonged heating and if the heating be too prolonged the product obtained is impure and has not the desired solubility in water. My new dyestuff, the partially dealkylated tetra-alkyl-rhodamin is thus obtained in the form of its hydrochloric acid salt and is characterized by the following properties: It occurs as a dark colored powder, sometimes showing a crystalline nature, it is soluble in water, soluble in alcohol giving red solutions possessing a yellow to green fluorescence; practically insoluble in ether and benzene. Caustic soda throws down a precipitate from the strong aqueous solution and this can be taken up by either giving a practically colorless or very slightly colored solution, on adding hydrochloric acid and water the intense red solution is regenerated. It dissolves in concentrated sulfuric acid giving an intensely yellow to orange solution which on dilution turns red. It dies silk and cotton in yellower shades than the tetra-alkyl-rhodamin from which it is, in each case obtained.

The specific dyestuff obtained from tetra-ethyl-rhodamin of the phthalic acid series is in the form of its hydrochloric acid salt a dark-colored crystalline powder with a bronze-like sheen, it possesses all the above named generic properties of dealkylated rhodamins and is further distinguished by the following specific properties: The red solution it gives in water is of a bluish shade and possesses a yellowish fluorescence, it is tolerably soluble in dilute hydrochloric acid so that it is not readily precipitated thereby from its weak aqueous solutions thus if a little dilute hydrochloric acid be added to a dye solution containing about one part dye to three hundred parts water no precipitate forms, though a crystallization may take place on standing. The free base is somewhat soluble in alkaline water, thus if a similar dye solution (1:300) be treated with a little dilute caustic soda no precipitate is obtained. It can be represented by the formula:

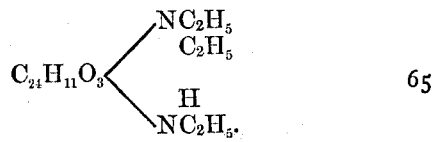

I do not wish to be understood as limiting myself to the presence or absence of any other material in heating the tetra-alkylated rhodamin for dealkylating the same.

What I claim as new, and desire to secure by Letters Patent, is—

1. As a new article of manufacture the dyestuff which can be obtained by partially dealkylating a tetra-alkyl-rhodamin, which dyestuff in the form of its hydrochloric acid salt appears as a dark colored powder soluble in water and in alcohol but practically insoluble in ether and benzene and which dyes more yellowish shades of red than the tetra-alkyl-rhodamin from which it can be obtained.

2. As a new article of manufacture the dyestuff which can be obtained by partially dealkylating the tetra-ethyl-rhodamin of the phthalic acid series, which dyestuff in the form of its hydrochloric acid salt appears as a dark colored crystalline powder possessing a bronze-like sheen, soluble in water and in alcohol but practically insoluble in ether and benzene and tolerably soluble in dilute hydrochloric acid, which yields a base somewhat soluble in alkaline water and which dyes more yellowish shades of red than the tetra-ethyl-rhodamin from which it can be obtained, substantially as described.

3. The process of producing a coloring matter which consists in heating tetra-alkylated rhodamin to partially dealkylate the same, substantially as described.

In testimony whereof I have hereunto set my hand in the presence of two subscribing witnesses.

MAURICE CERESOLE.

Witnesses:
GEO. D. FAIRFIELD,
C. A. HAUSMANN.